(12) United States Patent  
Wilson

(10) Patent No.: US 8,952,894 B2  
(45) Date of Patent: Feb. 10, 2015

(54) COMPUTER VISION-BASED MULTI-TOUCH SENSING USING INFRARED LASERS

(75) Inventor: Andrew David Wilson, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1051 days.

(21) Appl. No.: 12/118,955

(22) Filed: May 12, 2008

(65) Prior Publication Data

US 2009/0278799 A1  Nov. 12, 2009

(51) Int. Cl.
| | | |
|---|---|---|
| G06F 3/033 | (2013.01) |
| G06F 3/041 | (2006.01) |
| G06F 3/042 | (2006.01) |
| G06F 3/03 | (2006.01) |

(52) U.S. Cl.
CPC ............ G06F 3/0428 (2013.01); G06F 3/0304 (2013.01); G06F 3/0425 (2013.01)
USPC ........... 345/158; 345/156; 345/173; 715/700; 715/764

(58) Field of Classification Search
CPC .... G06F 3/0304; G06F 3/0425; G06F 3/0428
USPC ............................ 345/156–175; 400/472, 489
See application file for complete search history.

(56) References Cited

U.S. PATENT DOCUMENTS

| | | |
|---|---|---|
| 5,227,985 A | 7/1993 | DeMenthon |
| 5,317,140 A | 5/1994 | Dunthorn |
| 5,459,489 A | 10/1995 | Redford |
| 5,594,469 A | 1/1997 | Freeman et al. |
| 5,753,931 A | 5/1998 | Borchers et al. |
| 5,828,369 A | 10/1998 | Foster |
| 5,943,476 A | 8/1999 | Dougherty et al. |

(Continued)

FOREIGN PATENT DOCUMENTS

| | | |
|---|---|---|
| EP | 1653391 A2 | 5/2006 |
| JP | 8506193 | 7/1996 |

(Continued)

OTHER PUBLICATIONS

Wilson. PlayAnywhere: A Compact Interactive Tabletop Projection—Vision System. UIST'05, Oct. 23-27, 2005, Seattle, Washington, USA. ACM 1-59593-023-X/05/0010 http://research.microsoft.com/~awilson/papers/wilson%20playanywhere%20uist%202005.pdf. Last accessed Apr. 30, 2008, 10 pages.

(Continued)

*Primary Examiner* — Amare Mengistu  
*Assistant Examiner* — Jennifer Zubajlo  
(74) *Attorney, Agent, or Firm* — Dan Choi; Judy Yee; Micky Minhas

(57) ABSTRACT

The claimed subject matter provides a system and/or a method that facilitates detecting a plurality of inputs simultaneously. A laser component can be coupled to a line generating (LG) optic that can create a laser line from an infrared (IR) laser spot, wherein the laser component and line generating (LG) optic emit a plane of IR light. A camera device can capture a portion of imagery within an area covered by the plane of light. The camera device can be coupled to an IR-pass filter that can block visible light and pass IR light in order to detect a break in the emitted plane of IR light. An image processing component can ascertain a location of the break within the area covered by the emitted plane of IR light.

20 Claims, 10 Drawing Sheets

(56) References Cited

U.S. PATENT DOCUMENTS

| | | | |
|---|---|---|---|
| 6,115,028 A | 9/2000 | Balakrishnan et al. | |
| 6,128,003 A | 10/2000 | Smith et al. | |
| 6,151,595 A | 11/2000 | Pirolli et al. | |
| 6,404,506 B1 | 6/2002 | Cheng et al. | |
| 6,469,633 B1 | 10/2002 | Wachter | |
| 6,499,026 B1 | 12/2002 | Rivette et al. | |
| 6,624,833 B1* | 9/2003 | Kumar et al. | 715/863 |
| 6,710,770 B2 | 3/2004 | Tomasi et al. | |
| 6,788,809 B1 | 9/2004 | Grzeszczuk et al. | |
| 6,850,252 B1 | 2/2005 | Hoffberg | |
| 6,856,470 B2 | 2/2005 | Nishimura | |
| 6,907,581 B2 | 6/2005 | Noy et al. | |
| 6,920,619 B1 | 7/2005 | Milekic | |
| 6,970,098 B1 | 11/2005 | Adams et al. | |
| 6,982,697 B2 | 1/2006 | Wilson et al. | |
| 6,990,639 B2 | 1/2006 | Wilson | |
| 6,998,987 B2 | 2/2006 | Lin | |
| 7,000,200 B1 | 2/2006 | Martins | |
| 7,038,661 B2 | 5/2006 | Wilson et al. | |
| 7,066,388 B2 | 6/2006 | He | |
| 7,068,842 B2 | 6/2006 | Liang et al. | |
| 7,123,770 B2 | 10/2006 | Raghupathy et al. | |
| 7,200,639 B1 | 4/2007 | Yoshida | |
| 7,202,791 B2 | 4/2007 | Trajkovic | |
| 7,301,526 B2 | 11/2007 | Marvit et al. | |
| 7,307,661 B2* | 12/2007 | Lieberman et al. | 348/333.1 |
| 7,309,829 B1 | 12/2007 | Ludwig | |
| 7,333,090 B2 | 2/2008 | Tanaka et al. | |
| 7,355,632 B2 | 4/2008 | Shiiyama | |
| 7,365,736 B2 | 4/2008 | Marvit et al. | |
| 7,369,048 B2 | 5/2008 | Freund | |
| 7,427,980 B1 | 9/2008 | Partridge et al. | |
| 7,565,295 B1 | 7/2009 | Hernandez-Rebollar | |
| 7,577,655 B2 | 8/2009 | Curtiss et al. | |
| 7,584,099 B2 | 9/2009 | Ma et al. | |
| 7,627,834 B2 | 12/2009 | Rimas-Ribikauskas et al. | |
| 7,697,960 B2 | 4/2010 | Seo et al. | |
| 7,870,496 B1 | 1/2011 | Sherwani | |
| 7,904,913 B2 | 3/2011 | Sim-Tang et al. | |
| 7,970,176 B2 | 6/2011 | Kutliroff et al. | |
| 8,147,248 B2 | 4/2012 | Rimas-Ribikauskas et al. | |
| 8,165,422 B2* | 4/2012 | Wilson | 382/275 |
| 8,182,267 B2 | 5/2012 | Katz et al. | |
| 8,194,921 B2 | 6/2012 | Kongqiao et al. | |
| 8,214,387 B2 | 7/2012 | King et al. | |
| 2002/0036617 A1 | 3/2002 | Pryor | |
| 2002/0061217 A1* | 5/2002 | Hillman et al. | 400/489 |
| 2002/0118880 A1 | 8/2002 | Liu et al. | |
| 2003/0059081 A1 | 3/2003 | Trajkovic | |
| 2003/0067537 A1 | 4/2003 | Myers | |
| 2003/0193572 A1* | 10/2003 | Wilson et al. | 348/207.99 |
| 2004/0174542 A1 | 9/2004 | Handman et al. | |
| 2004/0193441 A1 | 9/2004 | Altieri | |
| 2004/0233172 A1 | 11/2004 | Schneider et al. | |
| 2005/0089204 A1* | 4/2005 | Carver et al. | 382/127 |
| 2005/0181347 A1 | 8/2005 | Barnes et al. | |
| 2005/0210417 A1 | 9/2005 | Marvit et al. | |
| 2005/0212751 A1 | 9/2005 | Marvit et al. | |
| 2005/0281475 A1* | 12/2005 | Wilson | 382/254 |
| 2006/0001650 A1 | 1/2006 | Robbins et al. | |
| 2006/0010400 A1* | 1/2006 | Dehlin et al. | 715/856 |
| 2006/0026536 A1 | 2/2006 | Hotelling et al. | |
| 2006/0027658 A1 | 2/2006 | Genc et al. | |
| 2006/0031786 A1 | 2/2006 | Hillis et al. | |
| 2006/0041590 A1 | 2/2006 | King et al. | |
| 2006/0055684 A1 | 3/2006 | Rimas-Ribikauskas et al. | |
| 2006/0061545 A1 | 3/2006 | Hughes et al. | |
| 2006/0061814 A1 | 3/2006 | Tokunaga | |
| 2006/0097991 A1* | 5/2006 | Hotelling et al. | 345/173 |
| 2006/0101384 A1 | 5/2006 | Sim-Tang et al. | |
| 2006/0125799 A1 | 6/2006 | Hillis et al. | |
| 2006/0125803 A1 | 6/2006 | Westerman et al. | |
| 2006/0128460 A1 | 6/2006 | Muir et al. | |
| 2006/0210958 A1 | 9/2006 | Rimas-Ribikauskas et al. | |
| 2006/0223635 A1 | 10/2006 | Rosenberg | |
| 2006/0229862 A1 | 10/2006 | Ma et al. | |
| 2006/0244719 A1* | 11/2006 | Brigham et al. | 345/156 |
| 2006/0256081 A1 | 11/2006 | Zalewski et al. | |
| 2007/0057793 A1 | 3/2007 | Alden | |
| 2007/0063991 A1 | 3/2007 | Lee et al. | |
| 2007/0109808 A1 | 5/2007 | Hobden et al. | |
| 2007/0177803 A1 | 8/2007 | Elias et al. | |
| 2007/0182818 A1 | 8/2007 | Buehler | |
| 2007/0192739 A1 | 8/2007 | Hunleth et al. | |
| 2007/0223015 A1 | 9/2007 | Lapstun et al. | |
| 2007/0251521 A1 | 11/2007 | Schackmuth et al. | |
| 2007/0283263 A1 | 12/2007 | Zawde et al. | |
| 2008/0028321 A1 | 1/2008 | Weksler et al. | |
| 2008/0029691 A1 | 2/2008 | Han | |
| 2008/0036743 A1 | 2/2008 | Westerman et al. | |
| 2008/0094370 A1 | 4/2008 | Ording et al. | |
| 2008/0167960 A1 | 7/2008 | Hughes | |
| 2008/0168403 A1 | 7/2008 | Westerman et al. | |
| 2008/0170776 A1 | 7/2008 | Albertson et al. | |
| 2008/0178126 A1 | 7/2008 | Beeck et al. | |
| 2008/0179507 A2 | 7/2008 | Han | |
| 2008/0191864 A1* | 8/2008 | Wolfson | 340/524 |
| 2008/0244468 A1 | 10/2008 | Nishihara et al. | |
| 2008/0250314 A1 | 10/2008 | Larsen | |
| 2008/0252596 A1* | 10/2008 | Bell et al. | 345/156 |
| 2008/0254426 A1 | 10/2008 | Cohen | |
| 2009/0049089 A1 | 2/2009 | Adachi et al. | |
| 2009/0121894 A1 | 5/2009 | Wilson et al. | |
| 2009/0257649 A1 | 10/2009 | Yamauchi et al. | |
| 2009/0278799 A1 | 11/2009 | Wilson | |
| 2009/0278806 A1 | 11/2009 | Duarte et al. | |
| 2009/0307623 A1 | 12/2009 | Agarawala et al. | |
| 2009/0324008 A1 | 12/2009 | Kongqiao et al. | |
| 2010/0031202 A1 | 2/2010 | Morris et al. | |
| 2010/0103269 A1 | 4/2010 | Wilson et al. | |
| 2010/0207874 A1 | 8/2010 | Yuxin et al. | |
| 2011/0019056 A1 | 1/2011 | Hirsch et al. | |
| 2011/0137900 A1 | 6/2011 | Chang et al. | |
| 2011/0263946 A1 | 10/2011 | el Kaliouby et al. | |
| 2011/0282785 A1 | 11/2011 | Chin | |
| 2012/0150651 A1 | 6/2012 | Hoffberg et al. | |

FOREIGN PATENT DOCUMENTS

| | | |
|---|---|---|
| JP | 2001109579 A | 4/2001 |
| JP | 2001159865 | 6/2001 |
| JP | 2002251235 | 9/2002 |
| JP | 2003005913 | 1/2003 |
| JP | 2003281652 | 10/2003 |
| JP | 2006163751 | 6/2006 |
| JP | 2006518076 | 8/2006 |
| JP | 2009525538 | 7/2009 |
| WO | WO0216865 A2 | 2/2002 |
| WO | WO 03063069 A2 * | 7/2003 |
| WO | WO03063069 A2 | 7/2003 |
| WO | WO2004072843 A1 | 8/2004 |
| WO | WO2005064275 | 7/2005 |
| WO | WO2005087460 A1 | 9/2005 |
| WO | WO2005114369 A2 | 12/2005 |
| WO | WO2007029038 A1 | 3/2007 |

OTHER PUBLICATIONS

Maas. Vision Systems http://www.vision-systems.com/display_article/285207/19/ARTCL/none/none/3-D-system-profiles-highway-surfaces/. Last accessed Apr. 30, 2008, 4 pages.

Dietz, et al. DiamondTouch: A Multi-User Touch Technology. USIT '01, Orlando Fla. ACM 1-58113-438-x/01/11 http://diamondspace.merl.com/papers/2001_dietz_diamondtouch.pdf. Last accessed Apr. 30, 2008, 8 pages.

Office Action for U.S. Appl. No. 12/185,166, mailed on May 5, 2011, Meredith J. Morris, "A User-Defined Gesture Set for Surface Computing," 22 pages.

Non-Final Office Action for U.S. Appl. No. 11/939,739, mailed on May 31, 2011, Andrew David Wilson, "Magic Wand," 7 pages.

Office Action for U.S. Appl. No. 12/425,405, mailed on Jul. 20, 2011, Andrew D. Wilson, "Magic Wand," 11 pages.

(56) References Cited

OTHER PUBLICATIONS

"Office Assistant," Wikipedia Free Encyclopedia, Nov. 1, 2006, 2 pages.
"Eye Toy", Wikipedia, Oct. 25, 2007, retrieved on Jan. 13, 2012 at <<http://en.wikipedia.org/w/index.php?title=EyeToy &oldid=166687900>> 5 pgs.
Office Action for U.S. Appl. No. 12/425,405, mailed on Jan. 23, 2012, Andrew D. Wilson, "Magic Wand", 12 pgs.
Office Action for U.S. Appl. No. 12/185,166, mailed on Oct. 27, 2011, Meredith June Morris, "User-Defined Gesture Set for Surface Computing", 28 pgs.
Office Action for U.S. Appl. No. 11/939,739, mailed on Nov. 17, 2011, Andrew D. Wilson, "Magic Wand", 10 pgs.
Office Action for U.S. Appl. No. 12/490,335, mailed on Dec. 15, 2011, Meredith June Morris, "User-Defined Gesture Set for Surface Computing", 23 pgs.
Rubine, "Specifying Gestures by Example", ACM, In the Proceedings of the 18th Annual Conference on Computer Graphics and Interactive Techniques, vol. 25, Issue 4, Jul. 1991, pp. 329-337.
Boukraa, et al., "Tag-Based Vision: Assisting 3D Scene Analysis with Radio-Frequency Tags", ISIF, Jul. 2002, pp. 412-418.
Cerrada, et al., "Fusion of 3D Vision Techniques and RFID Technology for Object Recognition in Complex Scenes", Proceedings of IEEE International Symposium on Intelligent Signal Processing, Oct. 2007, 6 pages.
The Chinese Office Action mailed Aug. 21, 2012 for Chinese patent application No. 200980117593.7, a counterpart foreign application of U.S. Appl. No. 12/118,955, 15 pages.
The European Search Report mailed Mar. 16, 2012 for European patent application No. 09747057.9, 8 pages.
Fishkin, et al., "I Sense a Disturbance in the Force: Unobtrusive Detection of Interactions with RFID-tagged Objects", Proceedings of UbiComp 2004, The Sixth International Conference on Ubiquitous Computing, Sep. 2004, 17 pages.
Harwig, "Continuous Change is a Way of living", Password: Philips Reasearch Technology magazine, issue 26, Feb. 2006, pp. 2-3 (+ cover).
Ishii, et al., "Tangible Bits: Towards Seamless Interfaces between People, Bits and Atoms", In Proceedings of CHI' 97, Mar. 1997, 8 pages.
Krahnstoever, et al., "Activity Recognition using Visual Tracking and RFID", In Proceedings of the Seventh IEEE Workshop on Applications of Computer Vision (WACV/MOTION'05), Jan. 2005, 7 pages.
Lee, et al., "Object Tracking Based on RFID Coverage Visual Compensation in Wireless Sensor Network", IEEE International Symposium on Circuits and Systems (ISCAS2007), May 2007, 4 pages.
"Microsoft Surface" http://www.microsoft.com/surfact/>> Last accessed Jun. 30, 2008, 1 page.
Nakagawa, et al., "Image Systems Using RFID Tag Positioning Information", In NTT Technical Review, vol. 1 No. 7, Oct. 2003, pp. 79-83.
Office Action for U.S. Appl. No. 12/185,174, mailed on Aug. 22, 2011, Andrew D. Wilson, "Fusing RFID and Vision for Surface Object Tracking", 43 pgs.
Office Action for U.S. Appl. No. 12/185,174, mailed on Jan. 30, 2012, Andrew D. Wilson, "Fusing RFID and Vision for Surface Object Tracking", 45 pgs.
Office Action for U.S. Appl. No. 12/490,335, mailed on Apr. 12, 2012, Meredith J. Morris, "User-Defined Gesture Set for Surface Computing", 28 pgs.
Office Action for U.S. Appl. No. 12/185,166, mailed on Apr. 13, 2012, Meredith J. Morris, "User-Defined Gesture Set for Surface Computing", 34 pgs.
Office action for U.S. Appl. No. 12/185,166, mailed on Sep. 7, 2012, Morris et al., "User-Defined Gesture Set for Surface Computing", 34 pages.
Olwal, "LightSense: Enabling Spatially Aware Handheld Interaction Devices", In Proceedings of ISMAR 2006 (IEEE and ACM International Symposium on Mixed and Augmented Reality), Oct. 2006, 4 pages.

Patten, et al., "Sensetable: A Wireless Object Tracking Platform for Tangible User Interfaces", In Proceedings of CHI 2001, Mar.-Apr. 2001, 8 pages.
Rahimi, et al., "Estimating Observation Functions in Dynamical Systems using Unsupervised Regression", retrieved from <<http://www.intel-research.net/seattle/pubs/100920061513_363.pdf>>, Sep. 19, 2006, 9 pages.
Raskar, et al., "Photosensing Wireless Tags for Geometic Procedures", Communications of the ACM, vol. 48, No. 9, , Sep. 2005, pp. 46-51.
Reilly, et al., "Marked-up maps: combining paper maps and electronic information resources", Personal and Ubiquitous Computing, vol. 10, Issue 4, Mar. 2006, pp. 215-226.
Rekimoto, et al., "Augmented Surfaces: A Spatially Continuous Work Space for Hybrid Computing Environments", In Proceedings of the SIGCHI Conference on Human Factors in Computing Systems, CHI'99, May 1999, 8 pages.
Rekimoto, et al., "DataTiles: A Modular Platform for Mixed Physical and Graphical Interactions", SIGCHI'01, vol. 1, Issue 3, Mar.-Apr. 2001, pp. 269-276.
Sugimoto, et al., "Supporting Face-to-face Group Activities with a Sensor-Embedded Board", ACM CSCW 2000, Workshop on Shared Environments to Support Face-to-Face Collaboration, Dec. 2000, 4 pages.
Ullmer, et al., "mediaBlocks: Physical Containers, Transports, and Controls for Online Media", In Computer Graphics Proceedings (SIGGRAPH'98), Jul. 1998, 8 pages.
Ullmer, et al., "Tangible Query Interfaces: Physically Constrained Tokens for Manipulating Databases Queries", In INTERACT'03, Aug. 2003, 8 pages.
Ullmer, et al., "The metaDESK: Models and Prototypes for Tangible User Interfaces", In Proceedings of UIST'97, Oct. 1997, 10 pages.
Want, et al., "Bridging Physical and Virtual Worlds with Electronic Tags", In Proceedings of CHI'99, Apr. 1999, 8 pages.
Wikipedia, "Eye Toy", Wikipedia, retrieved on Jan. 13, 2012 at <<http://en.wikipedia.org/w/index.php?title=EyeToy &oldid=166687900>>, 5 pgs.
Wilson, "BlueTable: Connecting Wireless Mobile Devices on Interactive Surfaces Using Vision-Based Handshaking", Proceedings of Graphics Interface Conference 2007, May 2007, 7 pages.
Woolls-King, et al., "Making electronic games more sociable", Password: Philips Reasearch technology magazine, Issue 26, Feb. 2006, pp. 24-27 (+ cover).
The Chinese Office Action mailed Nov. 2, 2012 for Chinese patent application No. 200980130773.9, a countperpart foreign application of U.S. Appl. No. 12/185,166, 16 pages.
The Chinese Office Action mailed Mar. 12, 2013 for Chinese patent application No., a counterpart foreign application of U.S. Appl. No. 12/118,955, 12 pages.
Office action for U.S. Appl. No. 12/490,335, mailed on Feb. 1, 2013, Morris et al., "User-Defined Gesture Set for Surface Computing", 29 pages.
Office action for U.S. Appl. No. 12/185,174, mailed on Jan. 22, 2013, Wilson et al., "Fusing RFID and Vision for Surface Object Tracking", 47 pages.
Wikipedia, "The Wisdom of Crowds", retrieved Nov. 27, 2007 at <<http://web.archive.org/web/20071228204455/http://en. wikipedia.org/wiki/>>, Dec. 2007, 8 pages.
The Chinese Office Action mailed Jul. 11, 2013 for Chinese patent application No. 200980117593.7, a counterpart foreign application of U.S. Appl. No. 12/118,955, 12 pages.
The Chinese Office Action mailed Jul. 4, 2013 for Chinese patent application No. 200980130773.9, a counterpart foreign application of U.S. Appl. No. 12/185,166, 6 pages.
Translated Japanese Office Action mailed May 28, 2013 for Japanese patent application No. 2011-509511, a counterpart foreign application of U.S. Appl. No. 12/118,955, 6 pages.
Office action for U.S. Appl. No. 12/490,335, mailed on May 10, 2013, Morris et al., "User-Defined Gesture Set for Surface Computing", 34 pages.
Office action for U.S. Appl. No. 12/185,166, mailed on Jun. 25, 2013, Morris et al., "User-Defined Gesture Set for Surface Computing", 37 pages.

(56) References Cited

OTHER PUBLICATIONS

Office action for U.S. Appl. No. 12/185,174, mailed on Jul. 9, 2013, Wilson et al., "Fusing RFID and Vision for Surface Object Tracking", 41 pages.

Office action for U.S. Appl. No. 11/939,739, mailed on Apr. 25, 2013, Wilson et al., "Magic Wand", 10 pages.

Chinese Office Action mailed Jan. 8, 2013 for Chinese patent application No. 200980130773.9, a counterpart foreign application of U.S. Appl. No. 12/185,166, 13 pages.

Translated Japanese Office Action mailed Sep. 24, 2013 for Japanese patent application No. 2011-522105, a counterpart foreign application of U.S. Appl. No. 12/185,166, 4 pages.

Office action for U.S. Appl. No. 12/490,335, mailed on Oct. 31, 2013, Morris, et al., "User-Defined Gesture Set for Surface Computing", 35 pages.

Office action for U.S. Appl. No. 12/185,166, mailed on Nov. 13, 2013, Morris, et al., "User-Defined Gesture Set for Surface Computing", 40 pages.

Voida, et al., "A Study on the Manipulation of 2D Objects in a Projector/Camera-Based Augmented Reality Environment", CHI 2005, Apr. 2005, 10 pages.

Wu, et al., "Multi-Finger and Whole Hand Gestural Interaction Techniques for Multi-User Tabletop Displays", Proceedings of the 16th annual ACM symposium on User interface software and technology, UIST '03, Nov. 2003, 12 pages.

Kjeldsen, "Polar Touch Detection", retrieved on Apr. 21, 2014 at <<ftp://ool-45795253.dyn.optonline.net/FantomHD/Manual%20backups/IBM%20Laptop/12-5-2012/Rick%20Second%Try/Gesture/PAPERS/UIST%20'06/Polar%20Touch%20Buttons%20Submit%20Spelling.pdf>>, 2007, 10 pages.

Office action for U.S. Appl. No. 12/425,405, mailed on Mar. 11, 2014, Wilson et al., "Magic Wand", 20 pages.

Final Office Action for U.S. Appl. No. 12/490,335, mailed on May 7, 2014, Meredith J. Morris, "User-Defined Gesture Set for Surface Computing", 57 pages.

Translated Chinese Office Action mailed Jul. 21, 2014 for Chinese patent application No. 200980130773.9, a counterpart foreign application of U.S. Appl. No. 12/185,166, 7 pages.

Translated Japanese Office Action mailed Jun. 3, 2014 for Japanese patent application No. 2011-522105, a counterpart foreign application of U.S. Appl. No. 12/185,166, 15 pages.

Office action for U.S. Appl. No. 12/425,405, mailed on Aug. 12, 2014, Wilson et al., "Magic Wand", 23 pages.

* cited by examiner

COMPUTER VISION-BASED MULTI-TOUCH SENSING USING INFRARED LASERS

BACKGROUND

Computing devices are increasing in technological ability wherein such devices can provide a plurality of functionality within a limited device-space. Computing devices can be, but not limited to, mobile communication devices, desktop computers, laptops, cell phones, PDA, pagers, tablets, messenger devices, hand-helds, pocket translators, bar code scanners, smart phones, scanners, portable handheld scanners, and any other computing device that allows data interaction. Although each device employs a specific function for a user, devices have been developing to allow overlapping functionality in order to appeal to consumer needs. In other words, computing devices have incorporated a plurality of features and/or applications such that the devices have invaded one another's functionality. For example, cell phones can provide cellular service, phonebooks, calendars, games, voicemail, paging, web browsing, video capture, image capture, voice memos, voice recognition, high-end mobile phones (e.g., smartphones becoming increasingly similar to portable computers/laptops in features and functionality), etc.

As a result, personal computing devices have incorporated a variety of techniques and/or methods for inputting information. Personal computing devices facilitate entering information employing devices such as, but not limited to, keyboards, keypads, touch pads, touch-screens, speakers, stylus' (e.g., wands), writing pads, etc. However, input devices such as keypads, speakers and writing pads bring forth user personalization deficiencies in which each user can not utilize the data entry technique (e.g., voice, and/or writing) similarly. For example, consumers employing writing recognition in the United States can write in English, yet have distinct and/or different letter variations.

Furthermore, computing devices can be utilized to communicate data or data interactions inputted via such above-described techniques. For instance, a user can use a desktop sharing application in order to share his or her computer screen which allows others to see/view the substantially similar information and/or interactions. In another example, a laptop can be used with a projector to communicate and/or display data to a group of individuals in a meeting. Still further, a PDA can be used with a display device (e.g., projector, television, flat-panel, monitor, etc.) to present a slide show while using a laser pointer to provide guidance on particular points. With the amount of data available, input techniques and communicating such data or interactions with data can be an essential aspect of functionality for devices, applications, hardware, and the like. Additionally, adapting computing devices or retrofitting computing devices to enhance input and data sharing techniques can be a difficult and costly venture.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing multiple touch detections for data interaction. In particular, an image processing component can receive a portion of data related to a detected break in a plane of infrared (IR) light, wherein such break can be analyzed with image processing techniques in order to map a corresponding location, size, and shape on a display or projected image. In general, the subject innovation can allow gestures, touch events, motions, and/or objects to be detected by capturing at least one break in the plane of emitted IR light. A laser component can be coupled to a line generating (LG) optic in order to transmit a plane of IR light across, for instance, a substantially flat surface. Breaks in the plane of IR light can be captured or detected by a camera device coupled with an IR pass filter. Such breaks can be received and translated by the image processing component in order to enable enhanced data interaction with, for instance, a display.

In accordance with another aspect of the subject innovation, the image processing component can be utilized with an application framework (e.g., plug-in, etc.). The application framework can leverage the detected and captured touch events, gestures, motions, and the like to enable enhanced data interaction. For instance, the application framework can include surface computing techniques in order to allow seamless and fluid data manipulation. In other aspects of the claimed subject matter, methods are provided that facilitate utilizing a plurality of lasers for data collection and interaction based upon a detected break in a plane of infrared (IR) light.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
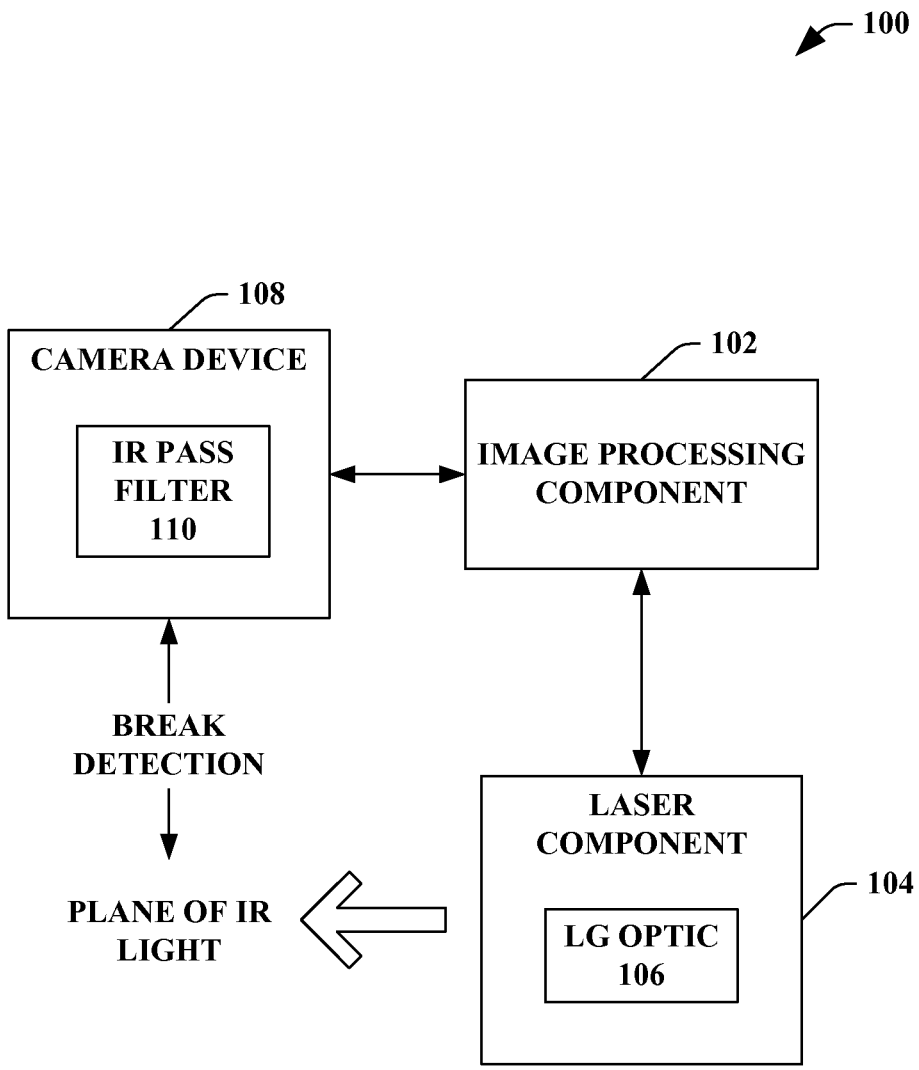
FIG. 1 illustrates a block diagram of an exemplary system that facilitates enabling multiple touch interactions with a display.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "laser," "optic," "camera," "display," "device," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates enabling multiple touch interactions with a display. The system 100 can include an image processing component 102 that can enable data interaction based upon detected touch events, wherein a touch event can be detected by tracking infrared (IR) light from a laser component 104 with a camera device 108. In general, the system 100 can detect motions, gestures, inputs, touch events, objects, and the like by detecting a break in a plane of IR light transmitted from the laser component 104. The break in the plane IR light can be evaluated and processed by the image processing component 102. It is to be appreciated that such plane of light emitted from the laser component 104 can be monitored in real time by the camera device 108. Based at least in part upon the detected break in the plane of IR light, the image processing component 102 can translate the break into corresponding location, shape, size, etc. in order to be utilized with data interaction. In particular, the laser component 104 can be coupled to a line generating (LG) optic 106 to create a laser line from a laser spot. The LG optic 106 and the laser component 104 can emit a plane of light, wherein a break in the plane of light can be detected and processed by the camera device 108 and image processing component 102 respectively. It is to be appreciated that the camera device 108 can include an IR pass filter 110 in order to block visible light and pass IR light.

The system 100 can be utilized in order to capture touch events such as, but not limited to, gestures, hand-motions, hand interactions, object interactions, and/or any other suitable corporeal object that can break a plane of IR light. For example, hand interactions that break the plane of emitted IR light can be detected in real time by the system 100 in order to be translated into corresponding data interactions on a display. Thus, touch event detection can be implemented by the configuration of the laser component 104 with the LG optic 106, the camera device 108 with the IR pass filter 110, and the image processing component 102. It is to be appreciated that a touch event can be any suitable break of the plane of IR light emitted by the laser component 104, wherein a break is a blockage of a portion of the plane of light emitted from the LG optic 106 and laser component 104. Moreover, it is to be appreciated that the system 100 is a compact, size-efficient, cost-efficient, and legacy device adaptable solution in order to provide touch event detection.

For instance, a plane of IR light can be broken by an object. Based upon the detection of such break, the image processing component 102 can analyze data in order to identify a location, a size, a shape, break characteristics (e.g., tracking, duration, etc.), etc. The image processing component 102 can translate such data to, for instance, a corresponding location on a display. The display (e.g., discussed in more detail below) can further render the corresponding shape and/or size of the object that caused the break in the plane of IR light. For example, a presentation of slides can be displayed and a presenter can interact with such data (e.g., highlight information, change slides with a gesture, open applications, touch-screen inputs, etc.) with the system 100 (e.g., hand motions captured and translated to the display, etc.). In another example, a user's desk surface can have a plane of IR light emitted parallel thereto in order to transform the desk surface into an area for data input or touch event detection. Thus, breaks in the plane of IR light from the desk surface can be utilized for data interaction for data on, for instance, a monitor or display. In another example, the system 100 can be implemented with a monitor in which the plane of IR light can be emitted parallel to the monitor screen or surface. Such break detections can be translated by the image processing component 102 to correspond with any displayed data.

Although the system 100 is discussed with the utilization of the IR light generated from the laser component 104, it is to be appreciated that any suitable light source or laser component 104 can be employed to generate a plane of light which can be broken (e.g., a break in the plane of light can be utilized to detect motion). For example, a red laser (e.g., green laser and/or any other suitable laser regardless of color) of sufficient brightness and/or a sufficiently dark room can be employed in order to detect and/or identify a break in such light source which enables motion detection. Although the visible laser light or light source may be distracting to a user, it could further provide useful feedback in the case where the plane of light is substantially parallel and above a surface. Furthermore, the plane of light can be above and away from a display surface (e.g., regardless of wavelength of laser light or light source). For instance, such an example can be utilized with gaming, online gaming, console gaming, etc.

In addition, the system 100 can include any suitable and/or necessary interface component (not shown), which provides various adapters, connectors, channels, communication paths, etc. to integrate the image processing component 102, the laser component 104, the LG optic 106, the camera device 108, and/or the IR pass filter 110 into virtually any operating and/or database system(s) and/or with one another. In addition, the interface component can provide various adapters, connectors, channels, communication paths, etc., that provide for interaction with the image processing component 102, the laser component 104, the LG optic 106, the camera device 108, and/or the IR pass filter 110, and any other device and/or component associated with the system 100.

Figure 2:
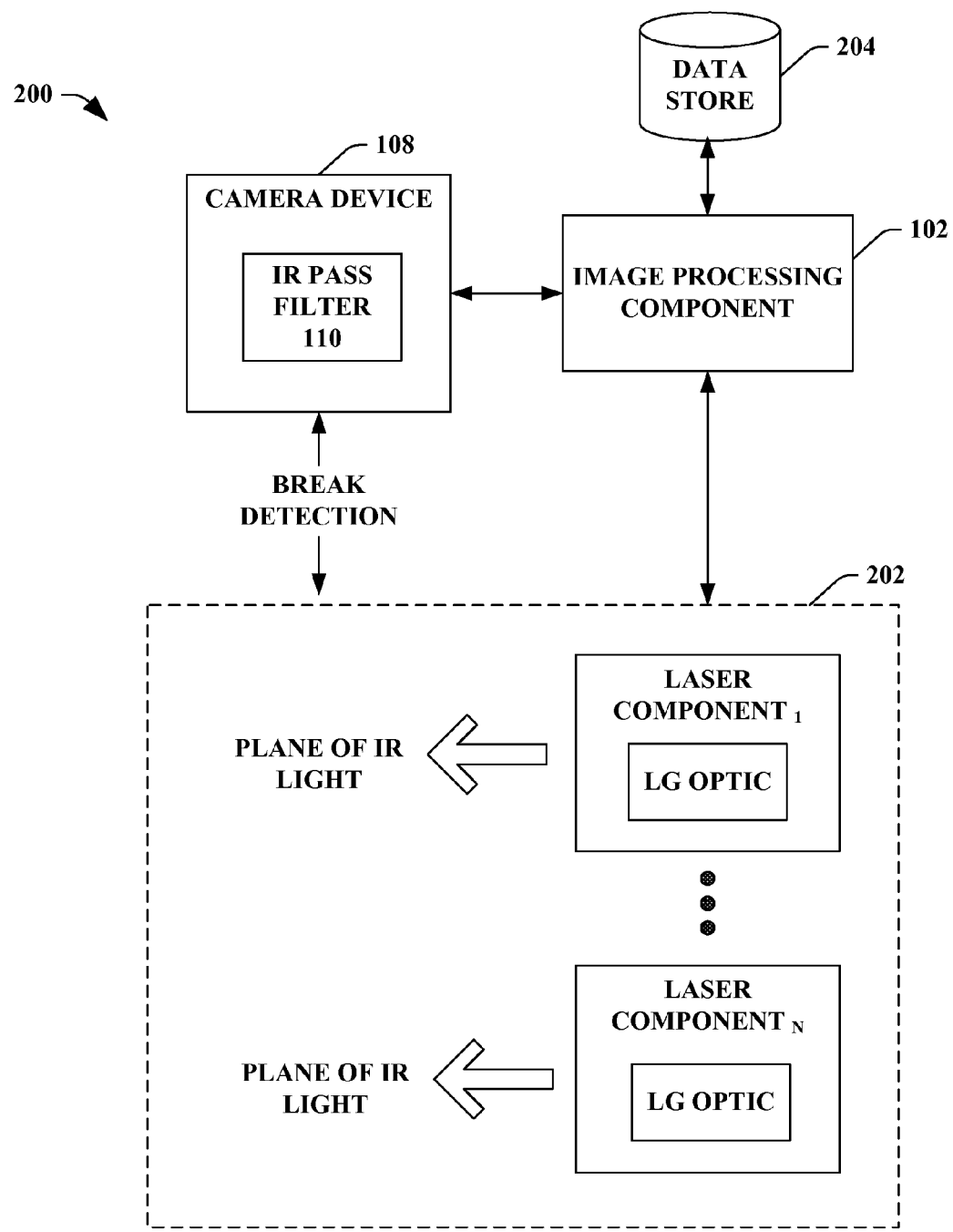
FIG. 2 illustrates a block diagram of an exemplary system that facilitates utilizing a plurality of lasers for data collection and interaction based upon a detected break in a plane of infrared (IR) light.

FIG. 2 illustrates a system 200 that facilitates utilizing a plurality of lasers for data collection and interaction based upon a detected break in a plane of infrared (IR) light. The system 200 can include the image processing component 102 that can ascertain a location associated with a detected break in a plane of transmitted IR light. The image processing component 102 can translate a location of the break of the plane of IR light to a corresponding position for data interaction. As discussed, a break in the plane of the IR light can be detected with the camera device 108 that uses the IR pass filter 110. Yet, it is to be appreciated that the camera device 102 can be any suitable imagery device that can capture imagery and/or data associated with IR light. For instance, the camera device 108 can be a camera, a video camera, an IR camera, an IR video camera, a web camera, a smartphone with a camera, and/or any other suitable device with camera capabilities.

The plane of IR light can be generated any suitable number of laser components 202 such as laser component 1 to laser component N, where N is a positive integer. Furthermore, it is to be understood that an increased number of laser components can provided more surface area coverage for the plane of IR light which allows for enhanced touch event detection. As depicted, each laser component 202 can include a respective LG optic, yet it is to be appreciated and understood that any suitable number of LG optics can be used (e.g., two or more laser components can share a single LG optic, etc.). For instance, in one configuration on a substantially flat surface shaped like a square, a first laser component can be placed in a first corner (e.g., the northwest corner) and a second laser component can be placed in a second corner (e.g., the northeast corner) to allow a plane of IR light to be projected parallel to the surface. In another example, the square shaped surface can include a laser component in each corner in order to provide more surface area coverage (e.g., more of the plane of IR light will cover the surface area of the square shaped surface).

In a particular example, the camera device 108 can be mounted above a projection surface (e.g., the surface to which the plane of IR light can be projected upon in a parallel manner). The at least one laser component and respective LG optic(s) can be mounted on the projection surface such that a plane of light emitted therefrom is parallel to the projected surface. In other words, the laser components are oriented so that the infrared light from the LG optic(s) form a plane of infrared light that skims the projection surface. It is to be appreciated that the height from the projection surface to the plane of IR light can be adjusted based upon preference for the intended use or data interaction.

The system 200 can further include a data store 204 that can include any suitable data related to the image processing component 102, the at least one laser component 202, the LG optic, the camera device 108, the IR pass filter 110, etc. For example, the data store 204 can include, but not limited to including, laser component configuration settings, camera device configuration settings, laser component orientation settings, laser component orientation definitions, user preferences, user passwords, usernames, mappings, image processing data, break detection data, sensitivity settings related to break detection, location data, IR sensitivity settings, size data related to a cause of a break in the plane of IR light, shape data related to a cause of a break in the plane of IR light, image processing techniques, image processing data, image tracking data, binarization data, IR modulation data, LG optic settings (e.g., spread size, strength, etc.), surface area data (e.g., size of surface, location of surface, type of surface, etc.), gestures, motions, application framework data, etc.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
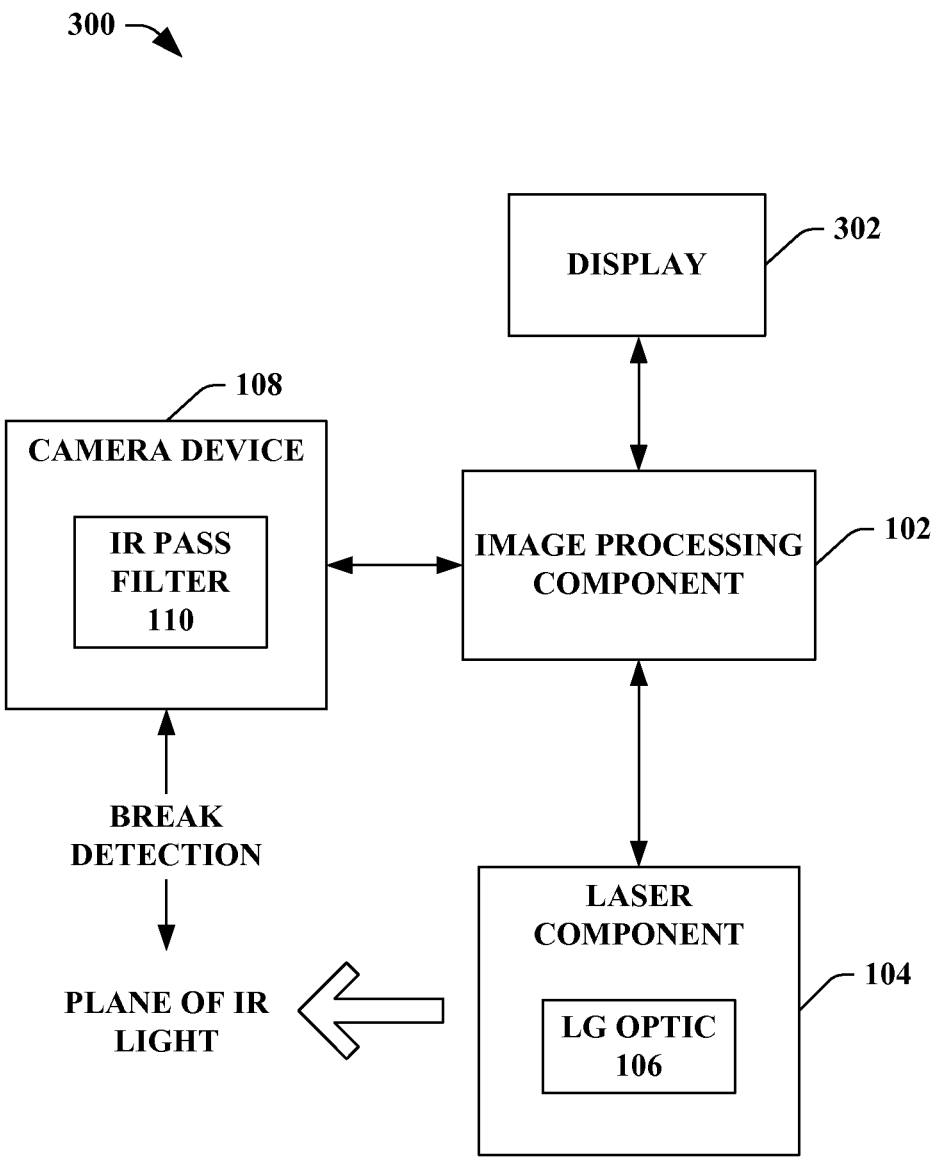
FIG. 3 illustrates a block diagram of an exemplary system that facilitates providing data interaction with a display according to detected touch events.

FIG. 3 illustrates a system 300 that facilitates providing data interaction with a display according to detected touch events. The system 300 can include the image processing component 102 that can receive any suitable data related to a detected break in a plane of IR light for use with data interaction. In particular, a touch event (e.g., an object, a gesture, a motion, a hand, a corporeal object, etc.) that breaks the plane of IR light transmitted from the laser component 104 (with the LG optic 106) can be detected by the camera device 108 (with the IR pass filter 110). Furthermore, it is to be appreciated that the system 300 can track touch events in real time in order to provide data interactions. For example, a break in the plane of IR light can be monitored and detected by the system 300 so as to provide real time video of the break and movement associated therewith.

The image processing component 102 can utilize any suitable image processing technique in order to bring the captured image (e.g., from the camera device 108 and IR pass filter 110) into alignment with a projected image on a display 302. For instance, a point in the captured image can be determined (e.g., a location of the break, a shape of the break, a size of the break, etc.), and/or a corresponding point in the projected image on the display 302 can be calculated. In another example, a user's hands or fingers can be placed on a surface to which the plane of IR light is projected parallel. In this example, the fingers or hands can catch a portion of the IR light (e.g., break the plane of IR light), which can be captured by the camera device 108 as a portion of a bright region (e.g., utilizing the IR pass filter 110). Such portions of bright regions can be detected as tracked objects by the image processing component 102. For instance, the image processing component 102 can employ binarization, image analysis, captured image analysis, etc. Moreover, it is to be appreciated that the display 302 can be any suitable display component such as, but not limited to, a monitor, a television, a liquid crystal display (LCD), a plasma, a rear-projection display, a front-projection display, a cathode ray tube (CRT) monitor, a flat-panel, a display for a computing device, a portable digital assistance (PDA) screen, a laptop display, a computer monitor, a smartphone display, a cellular device screen, a mobile communication device display, a portable gaming device display, etc.

Figure 4:
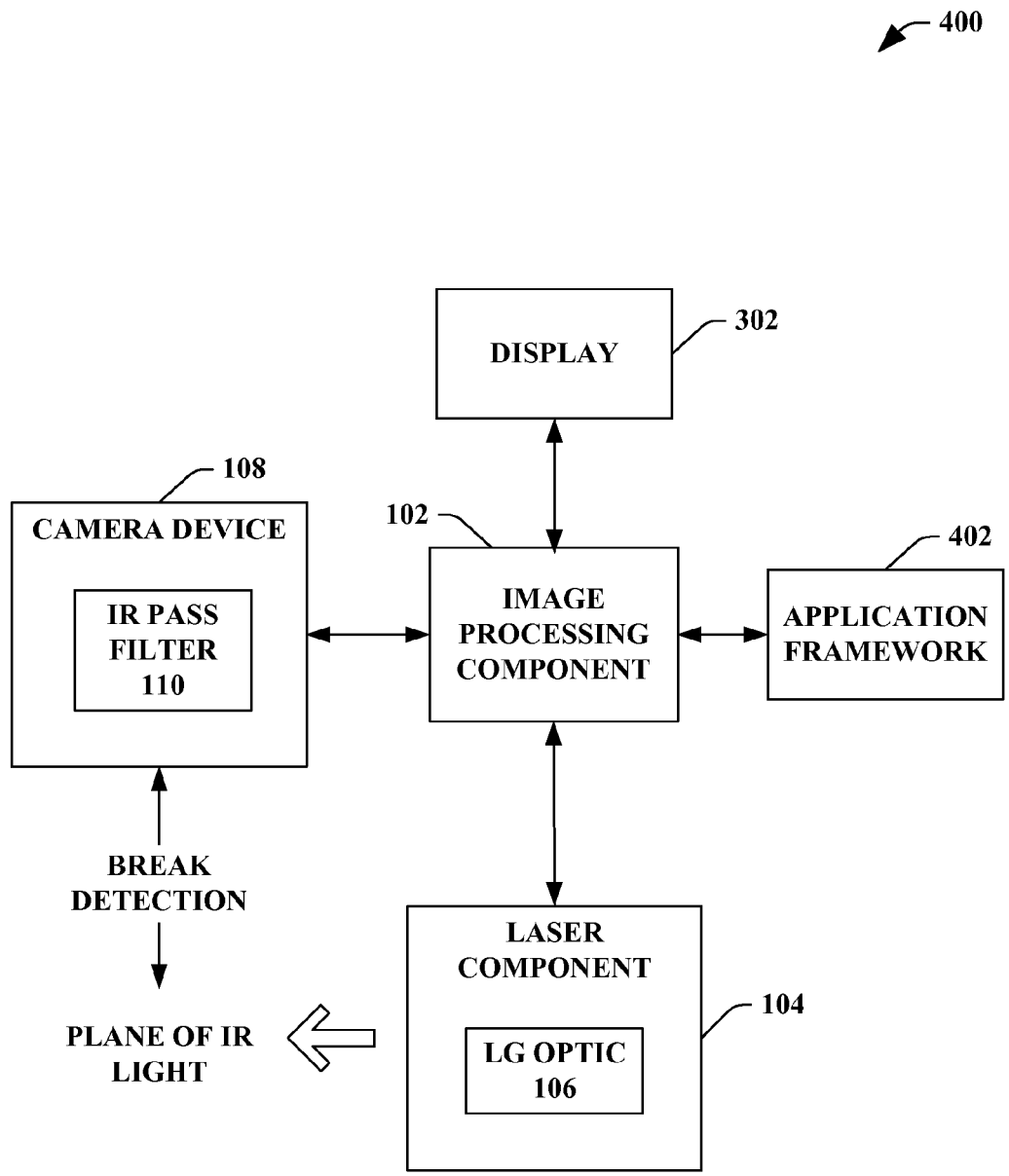
FIG. 4 illustrates a block diagram of an exemplary system that facilitates utilizing at least one IR emitting laser for data collection and interaction with an application framework.

FIG. 4 illustrates a system 400 that facilitates utilizing at least one IR emitting laser for data collection and interaction with an application framework. The system 400 can include the image processing component 102 that enables a detected break of the plane of IR light to be translated into a corresponding location, size, and shape on the display 302. In particular, the laser component 104 can be coupled to the LG optic 106 in order to generate a plane of IR light. A break or disruption (e.g., an object that reflects a portion of the plane of IR light, etc.) of such plane of IR light can be detected by the camera device 108 utilizing the IR pass filter 110.

The mapping, translation, and corresponding size, shape, and/or location of the break of the plane of IR light can be utilized with the display 302. For instance, motions, gestures, and/or objects can be detected by the system 300, wherein such motions, gestures, and/or objects can be displayed and/or replicated onto the display 302. In particular, a stylus can break the plane of IR light while writing in which the system 300 can detect and track such motions based upon the break of the plane of IR light in order to render such motions on the display 302. Moreover, the detection of a particular motion or gesture can trigger a function or output. For instance, a detected motion such as drawing a question mark can trigger a help feature or application.

It is to be appreciated and understood that the detected touch events (e.g., motions, gestures, objects, etc.) can be utilized in connection with any suitable components, devices, applications, software, hardware, etc. In particular, the detected touch events can be utilized with an application framework 402. For instance, the application framework 402 can include software associated with surface computing that enables interaction with data (e.g., images, icons, files, video, sound clips, data, etc.). The surface computing software can allow movements and/or gestures to control functions such as, but not limited to, zooming, panning, stretching, etc. Moreover, the surface computing applications can recognize with distinct shapes or objects (e.g., a video playing on a detected rectangle of a defined size, a cell phone image detected, an image displayed upon the detection of a particular pattern, etc.). In general, surface component can be a portion of software and/or hardware that employs a specialized computer graphic user interface (GUI). For instance, a user can interact directly with a touch-sensitive screen or display in which the touch event detection is captured by the system 400. In another example, the application framework 402 can include software related to digital content interaction that enable data to be grabbed with a user's hand and move such information between objects with natural gestures and touch. In particular, a tabletop display can be utilized in connection with the detected touch events with the system 400 to enable seamless interaction with data.

Figure 5:
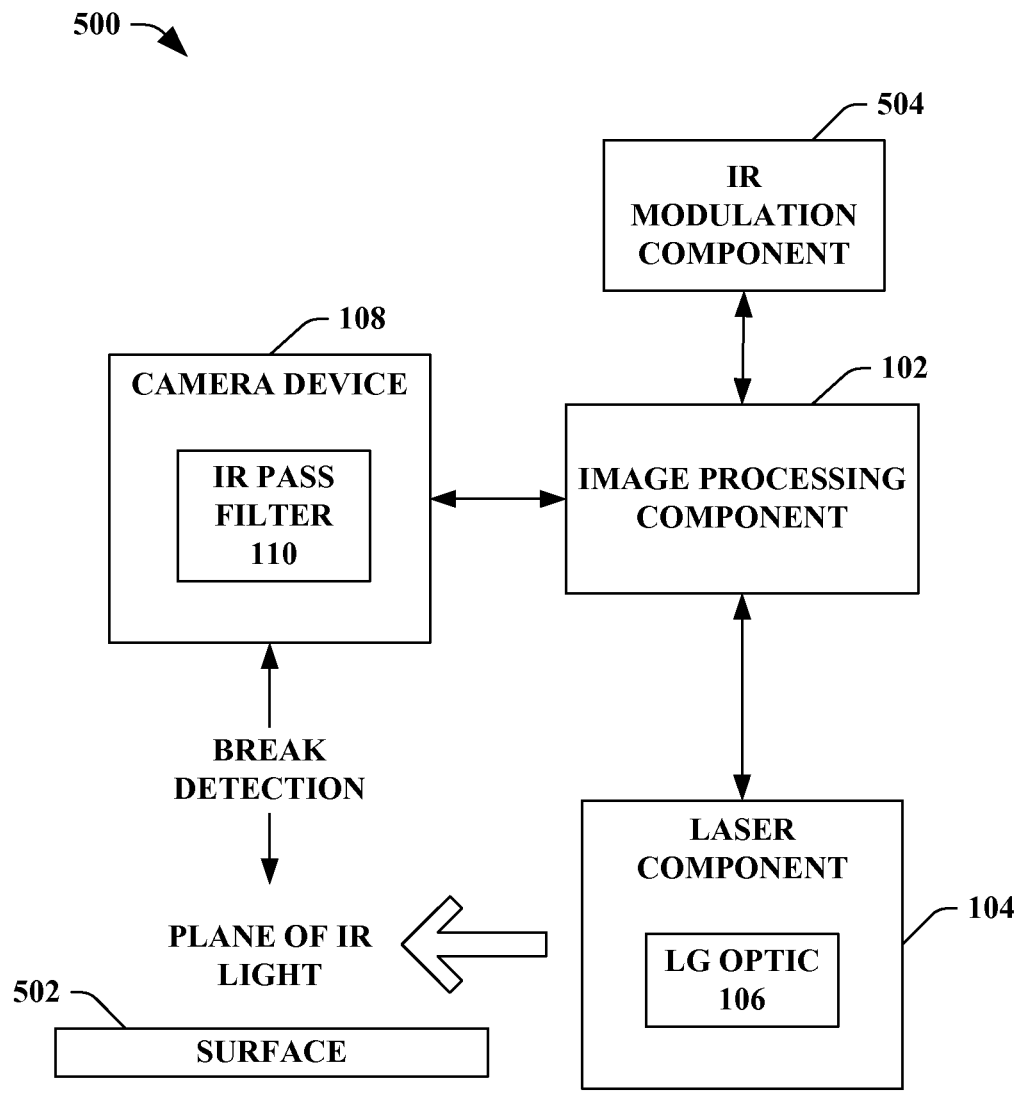
FIG. 5 illustrates a block diagram of exemplary system that facilitates enabling multiple touch interactions by detecting a break in a plane of IR light projected across a surface.

FIG. 5 illustrates a system 500 that facilitates enabling multiple touch interactions by detecting a break in a plane of IR light projected across a surface. The system 500 can include the image processing component 102 that can detect real time touch events that break a plane of IR light emitted from the laser component 104 utilizing the LG optic 106. In particular, the plane of IR light can be projected parallel to a surface 502, wherein a break in such plane of IR light can be detected by the camera device 108 utilizing the IR pass filter 110. Based on the object breaking the plane of IR light, the IR light is detected which enables the camera device 108 and IR pass filter 110 to capture such touch event (e.g., motion, gesture, break in IR light, etc.). It is to be appreciated that the surface 502 can be any substantially flat surface such as, but not limited to, a desk, a table, a wall, a display, a television, a laptop, a floor, a ceiling, a section of the ground, a section of concrete, a piece of wood, a chalkboard, a projection screen, a motor vehicle windshield, a motor vehicle window, a motor vehicle dashboard, a substantially flat surface associated with a device, a substantially flat surface related to a vehicle (e.g., a car, truck, all-terrain vehicle (ATV), a motorcycle, a moped, a scooter, etc.), a tray on an airplane, etc. In general, the subject innovation can be utilized with various everyday surfaces to enable data interaction via detected touch events. In still another example, the system 500 can be incorporated into the surface 502 (e.g., the laser component 104 and/or the LG optic 106 is embedded into a desk, etc.).

The touch event detection system 500 can further utilize various settings for the laser component 104 and/or the LG optic 106. For instance, a spread size of the laser component 104 can be adjusted based at least in part upon the area of the surface 502 to which the plane of IR light should cover. A larger spread size (e.g., increased angle of coverage) can cover a larger angle of the surface 502 yet the range will decrease. A smaller spread size can limit the angular (e.g., conical shaped) coverage of the surface 502 yet increase the range (e.g., distance from the laser). It is to be appreciated that any suitable adjustments to the settings for the laser component 104 can be utilized.

The system 500 can further include an IR modulation component 504 in order to compensate for IR light not generated by the laser component 104 and/or the LG optic 106. IR light not generated by the laser component 104 and/or the LG optic 106 can be, for example, fray daylight, ambient light, incandescent light, halogen light, etc. In order to compensate or eliminate this IR light, the IR modulation component 504 can turn the laser component 104 'ON and 'OFF,' wherein multiple images include pairs of imagery with the laser component 104 being ON and OFF. In other words, one image can have the ambient light (e.g., detected with the camera device 108 and the laser component 104 'OFF,' also referred to as a first collection) and the other can have the ambient light plus the IR generated light (e.g., detected with the camera device 108 and the laser component 104 'ON,' also referred to as a second collection). These two images can be subtracted (e.g., first collection subtracted with the second collection) to eliminate the ambient light from the detection. This can be utilized as a filter or screen in order to compensate for the ambient or refracted IR light not generated by the laser component 104 and/or the LG optic 106.

Figure 6:
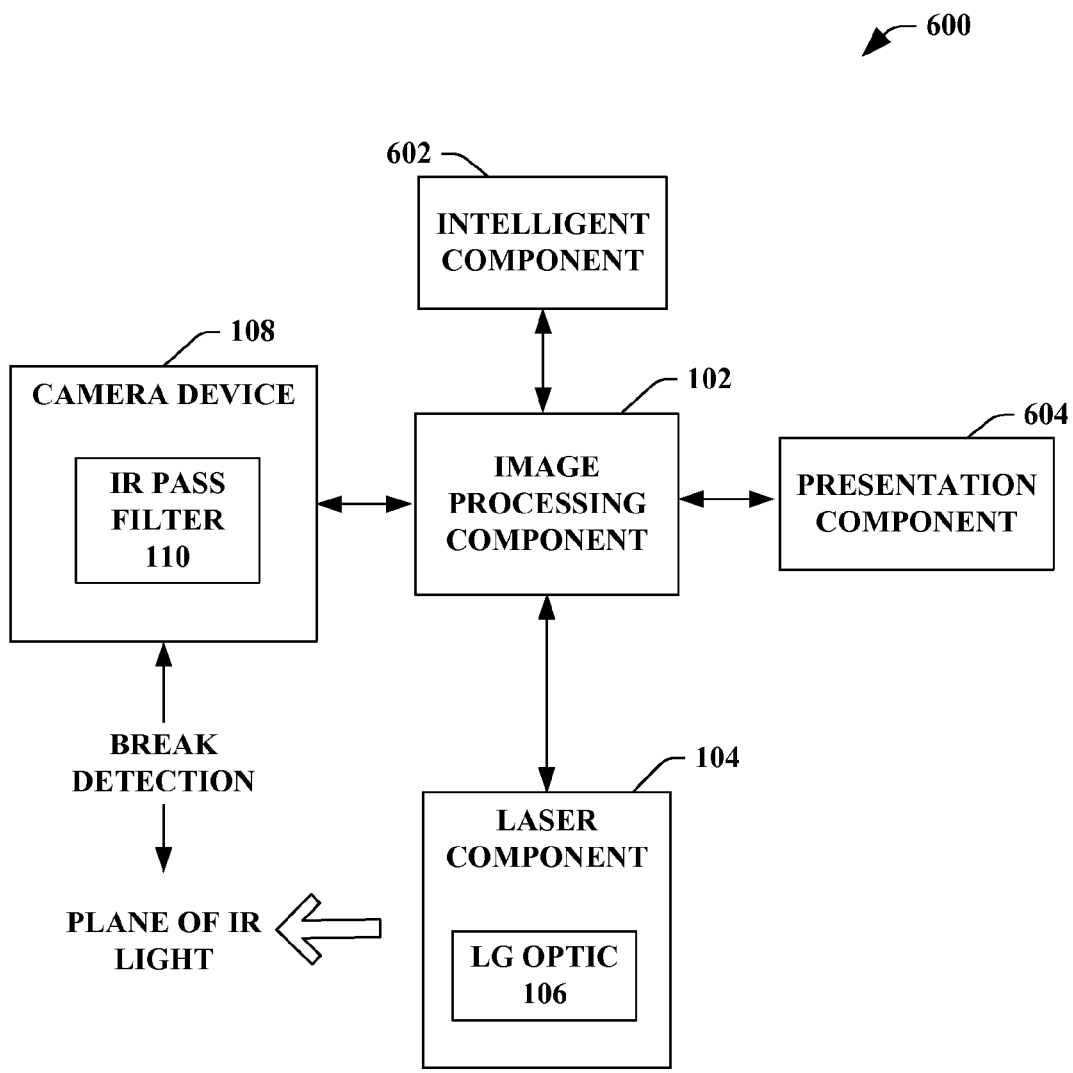
FIG. 6 illustrates a block diagram of an exemplary system that facilitates detecting multiple interactions using at least a camera device and a laser component in accordance with the subject innovation.

FIG. 6 illustrates a system 600 that employs intelligence to facilitate detecting multiple interactions using at least a camera device and a laser component in accordance with the subject innovation. The system 600 can include the image processing component 102, the laser component 104, the LG optic 106, the camera device 108, and the IR pass filter 110 which can be substantially similar to respective components, optics, devices, and filters described in previous figures. The system 600 further includes an intelligent component 602. The intelligent component 602 can be utilized by the image processing component 102 to facilitate detecting touch events utilizing the system 600 configuration. For example, the intelligent component 602 can infer a break of the plane of IR light location, a size related to a break in the IR light plane, a shape related to the break in the IR light plane, tracking related to a touch event within the plane of IR light, user preferences, LG optic 106 settings, orientation for the camera device 108, orientation for the laser component 104, settings related to a display, modulation frequency/settings, ambient light detections, gesture evaluation, motion evaluation, touch event prediction, etc.

The intelligent component 602 can employ value of information (VOI) computation in order to identify a break in the plane of IR light and characteristics associated therewith (e.g., size, location, shape, etc.). For instance, by utilizing VOI computation, the most ideal and/or appropriate break detection or touch event can be identified and utilized (e.g., a first touch event associated with a first data interaction can be a lower priority in comparison to a second touch event associated with a second data interaction, etc.). Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The image processing component 102 can further utilize a presentation component 604 that provides various types of user interfaces to facilitate interaction between a user and any component coupled to the image processing component 102. As depicted, the presentation component 604 is a separate entity that can be utilized with the image processing component 102. However, it is to be appreciated that the presentation component 604 and/or similar view components can be incorporated into the image processing component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the image processing component 102. In addition, it is to be appreciated that the presentation component 604 can employ surface computing software, hardware, and/or any suitable combination thereof.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
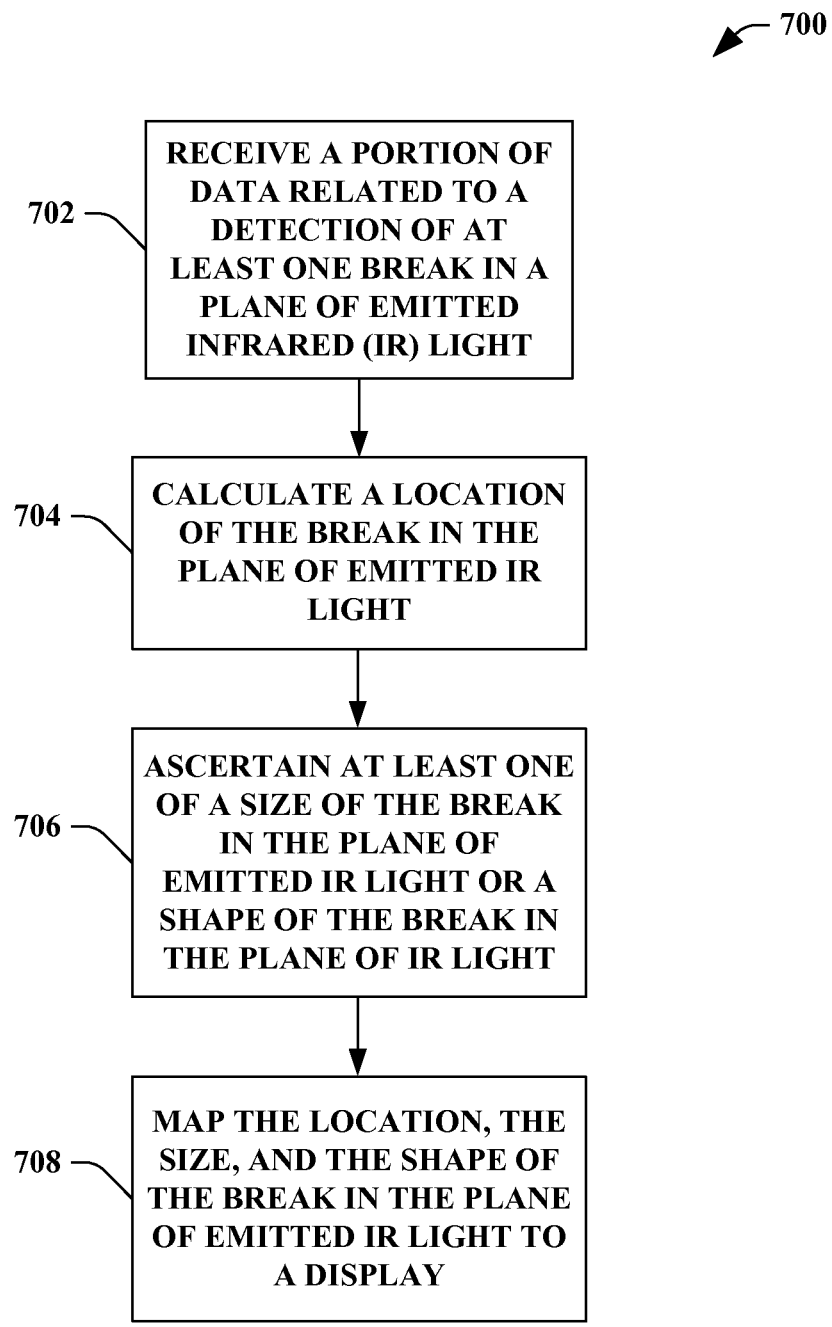
FIG. 7 illustrates an exemplary methodology for utilizing at least one laser for data collection and interaction based upon a detected break in a plane of infrared (IR) light.
Figure 8:
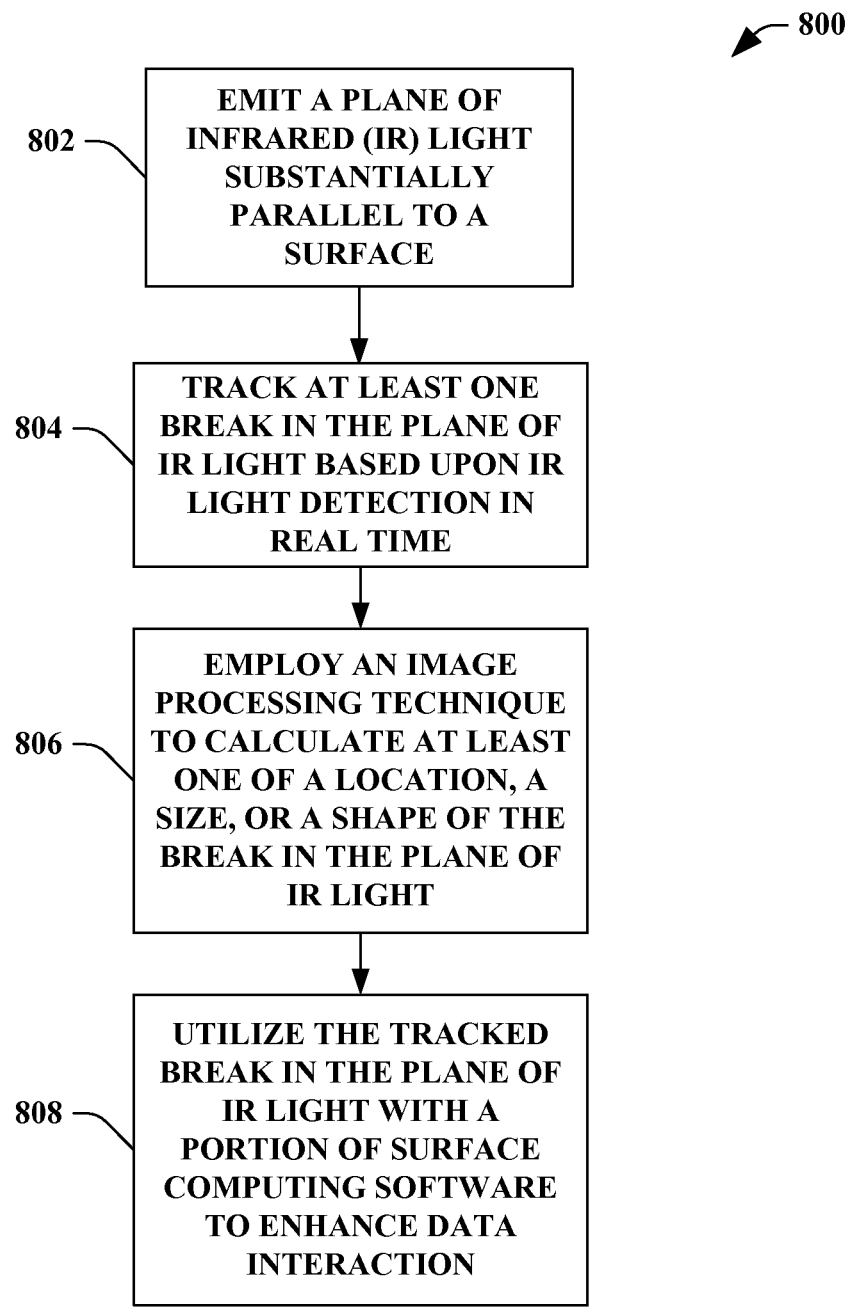
FIG. 8 illustrates an exemplary methodology that facilitates utilizing at least one IR emitting laser for data collection and interaction with an application framework.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates utilizing at least one laser for data collection and interaction based upon a detected break in a plane of infrared (IR) light. At reference numeral 702, a portion of data related to a detection of at least one break in a plane of emitted infrared (IR) light can be received. For example, a plane of emitted IR light can be emitted from any suitable laser component that can transmit a plane of IR light. In particular, the laser component can employ a line generating (LG) optic in order to provide a plane of IR light. The portion of data related to a detection of at least one break in the plane of emitted IR light can be captured by, for instance, any suitable device capable of detecting IR light reflection.

At reference numeral 704, a location of the break in the plane of emitted IR light can be calculated. Based at least in part upon the detection of the break in the plane of emitted IR light, a corresponding location of the detected break can be calculated. For instance, data related to a point of detection for a break in the plane of IR light can be analyzed in order to identify a location of the break in connection with the surface area covered by the plane of IR light. At reference numeral 706, at least one of a size of the break in the plane of emitted IR light or a shape of the break in the plane of IR light is ascertained. For example, the size of the break in the plane of IR light can be identified as well as the size in order to render an accurate portrayal of such on a display. Thus, a hand that breaks a plane of IR light can be accurately calculated and/or ascertained in comparison to a finger that breaks the plane of IR light. In other words, the location, size, and shape of the object that breaks the plane of IR light can be determined. At reference numeral 708, the location, the size, and the shape of the break in the plane of emitted IR light can be mapped to a display.

Although the method 700 is discussed with the utilization of the IR light, it is to be appreciated that any suitable light source or laser component 104 can be employed to generate a plane of light which can be broken (e.g., a break in the plane of light can be utilized to detect motion). For example, a red laser of sufficient brightness and/or a sufficiently dark room can be employed in order to detect and/or identify a break in such light source which enables motion detection. Although the visible laser light or light source may be distracting to a user, it could further provide useful feedback in the case where the plane of light is substantially parallel and above a surface. Furthermore, the plane of light can be above and away from a display surface (e.g., regardless of wavelength of laser light or light source). For instance, such an example can be utilized with gaming, online gaming, console gaming, etc.

FIG. 8 illustrates a method 800 for utilizing at least one IR emitting laser for data collection and interaction with an application framework. At reference numeral 802, a plane of infrared (IR) light can be emitted substantially parallel to a surface. It is to be appreciated that the surface can be, but is not limited to being, a desk, a table, a wall, a display, a television, a laptop, a floor, a ceiling, a section of the ground, a section of concrete, a piece of wood, a chalkboard, a projection screen, a motor vehicle windshield, a motor vehicle window, a motor vehicle dashboard, a substantially flat surface associated with a device, a substantially flat surface related to a vehicle (e.g., car, truck, all-terrain vehicle (ATV), a motorcycle, a moped, a scooter, etc.), etc. In general, the subject innovation can be utilized with various everyday surfaces to enable data interaction via detected touch events. In still another example, the system 500 can be incorporated into the surface 502 (e.g., the laser component 104 and/or the LG optic 106 is embedded into a desk, etc.), a tray on an airplane, and/or any other suitable surface that is substantially flat.

At reference numeral 804, at least one break in the plane of IR light can be tracked based upon a portion of IR light detection in real time. In other words, a real time monitoring of the plane of IR light can provide a tracking of breaks, and more over, a tracking of motion based on continuous tracking of the plane of IR light. At reference numeral 806, an image processing technique can be employed to calculate at least one of a location, a size, or a shape of the break in the plane of IR light. For instance, the detected and calculated break can be rendered or mapped to a corresponding display, wherein such display can illustrate the replicated break with the respective location, size, and/or shape.

At reference numeral 808, the tracked break in the plane of IR light can be utilized with a portion of surface computing software to enhance data interaction. The surface computing software can allow movements and/or gestures to control functions such as, but not limited to, zooming, panning, stretching, etc. Moreover, the surface computing applications can recognize with distinct shapes or objects (e.g., a video playing on a detected rectangle of a defined size, a cell phone image detected, an image displayed upon the detection of a particular pattern, etc.). In general, surface component can be a portion of software and/or hardware that employs a specialized computer graphic user interface (GUI). In other words, the manner of detecting gestures, motions, and/or touch events utilizing IR light and the described techniques can be utilized in connection with any suitable surface computing software, hardware, and/or any suitable combination thereof.

Figure 9:
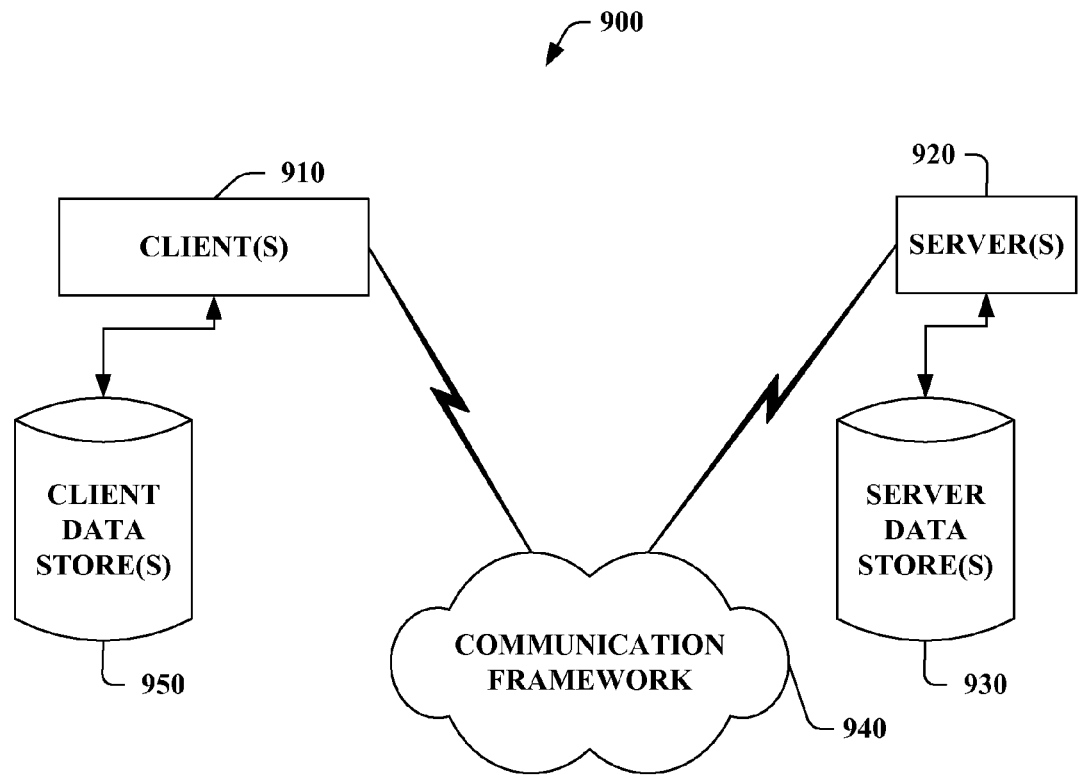
FIG. 9 illustrates an exemplary networking environment, wherein the novel aspects of the claimed subject matter can be employed.
Figure 10:
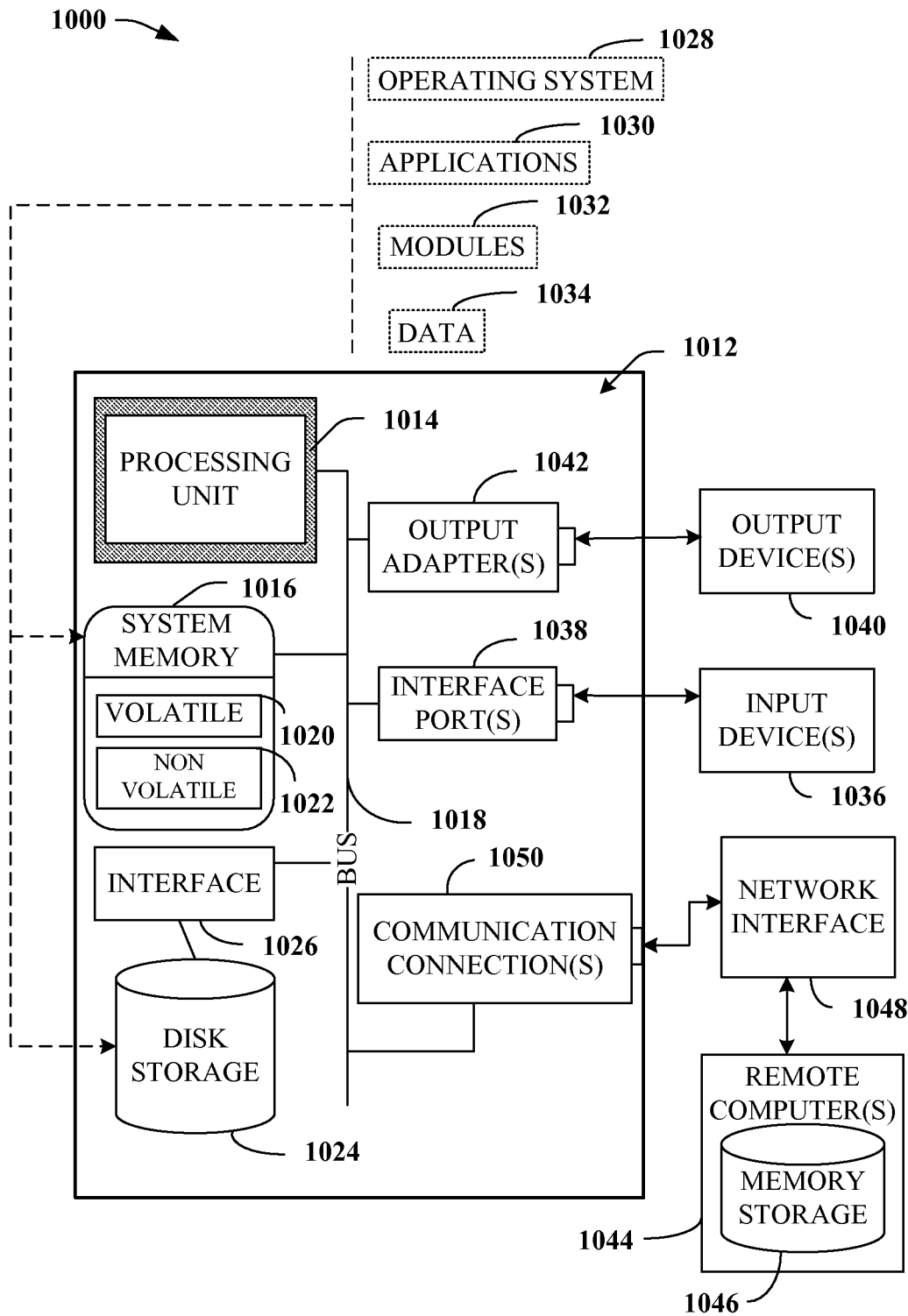
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an image processing component utilized to detect touch events or interactions with a plane of IR light, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
    a laser component;
    a line generating (LG) optic coupled to the laser component to emit a plane of light substantially parallel to a first side of a substantially flat surface;
    a camera device mounted on the first side of the substantially flat surface to capture a portion of imagery within an area covered by the plane of light and to detect a break in the plane of light caused by a presence of an object located on the first side of the substantially flat surface; and
    an image processing component to ascertain a location of the break within the area covered by the plane of light, the image processing component further configured to calculate at least one of a size of the break or a shape of the break and to display a corresponding shape or size of the break at a corresponding location on a display for interaction with data presented on the display at the corresponding location where the corresponding shape or size of the break is displayed, the corresponding location on the display comprising a mapped coordinate representative of the location of the break.

2. The system of claim 1, wherein the interaction with the data presented on the display is based at least in part on the shape of the break, and wherein the shape of the break corresponds to a pattern associated with the interaction, and wherein the interaction with the data presented on the display comprises at least one of highlighting the data presented on the display or displaying an image or video on the display at the corresponding location.

3. The system of claim 1, wherein the substantially flat surface comprises the display.

4. The system of claim 1, further comprising a plurality of laser components with at least one LG optic coupled thereto, the plurality of laser components are oriented to emit the plane of light.

5. The system of claim 1, wherein the plane of light comprises infrared (IR) light, the system further comprising an IR pass filter coupled to the camera device to block visible light and to pass IR light permitting the image processing component to detect the break in the IR light.

6. The system of claim 5, further comprising an IR modulation component to compensate for a portion of IR light generated by a source other than the laser component and the LG optic.

7. The system of claim 6, wherein the IR modulation component is further configured to control the laser component with a sequence of an "OFF" command and an "ON" command while the camera device captures the following:
    a first collection of IR light including the portion of IR light generated by the source other than the laser component and the LG optic during the "OFF" command; and
    a second collection of IR light including the plane of IR light and the portion of IR light generated by the source other than the laser component and the LG optic during the "ON" command.

8. The system of claim 7, wherein the IR modulation component is further configured to identify the portion of IR light generated by the source other than the laser component and the LG optic by subtracting the second collection of IR light and the first collection of IR light, the portion of IR light generated by the source other than the laser component and the LG optic is filtered out from the camera device.

9. The system of claim 1, wherein the image processing component is further configured to detect touch events based at least in part on the break.

10. The system of claim 1, further comprising an application framework that leverages the location of the break for at least one of a data input or data interaction.

11. The system of claim 10, wherein the application framework is further configured to utilize surface computing techniques with a touch-sensitive screen in which touch detection is provided by the break.

12. The system of claim 1, further comprising an application framework to cause a video to be played in response to recognizing the size of the break as a defined size or recognizing the shape of the break as a particular shape.

13. A method, comprising:
generating, using a laser component and a line generating (LG) optic, a plane of infrared (IR) light substantially parallel to a first side of a substantially flat surface via a sequence of an "OFF" command and an "ON" command to the laser component while a camera device mounted on the first side of the substantially flat surface captures the following:
a first collection of IR light including a portion of IR light generated by a source other than the laser component and the LG optic during the "OFF" command; and
a second collection of IR light including the plane of IR light and the portion of IR light generated by the source other than the laser component and the LG optic during the "ON" command;
identifying the portion of IR light generated by the source other than the laser component and the LG optic by calculating the difference between the first collection of IR light and the second collection of IR light;
detecting a break in the plane of IR light caused by a presence of an object located on the first side of the substantially flat surface;
calculating a location of the break within an area covered by the plane of IR light;
ascertaining at least one of a size of the break or a shape of the break; and
mapping the location and the size or the shape of the break to a display such that a corresponding size or shape of the break is displayed at a corresponding location on the display resulting from the mapping for interaction with data presented on the display at the corresponding location on the display where the corresponding size or shape is displayed.

14. The method of claim 13, further comprising:
detecting a plurality of sequential breaks in the plane of IR light;
calculating a plurality of locations corresponding to the plurality of sequential breaks; and
tracking the plurality of locations.

15. The method of claim 13, further comprising:
receiving the location, size, and shape of the break with an application framework; and
utilizing the application framework to interact with data based at least in part upon the break, the application framework employs at least one surface computing technique.

16. A method, comprising:
emitting, using a laser component and a line generating (LG) optic coupled to the laser component, a plane of light substantially parallel to a first side of a substantially flat surface;
capturing, using a camera device mounted on the first side of the substantially flat surface, a portion of imagery within an area covered by the plane of light;
detecting a break in the plane of light caused by a presence of an object located on the first side of the substantially flat surface;
determining, using an image processing component, a location of the break within the area covered by the plane of light;
calculating at least one of a size of the break or a shape of the break; and
displaying a corresponding shape or size of the break at a corresponding location on a display for interaction with data presented on the display at the corresponding location where the corresponding shape or size is displayed, the corresponding location on the display comprising a mapped coordinate representative of the location of the break.

17. The method of claim 16, further comprising:
determining a motion of the object by tracking a plurality of sequential breaks in the plane of light; and
determining a touch event based on the motion.

18. The method of claim 16, wherein the plane of light comprises infrared (IR) light, the method further comprising blocking, using an IR pass filter coupled to the camera device, visible light and passing IR light permitting the detecting the break in the IR light.

19. The method of claim 18, further comprising compensating, using an IR modulation component, for a portion of IR light that is generated by a source other than the laser component and the LG optic.

20. The method of claim 16, further comprising inferring a touch event using value of information (VOI) computing techniques, the VOI computing techniques comprising inferring a plurality of touch events as a result of a plurality of breaks detected by the camera and assigning a priority to each of the plurality of touch events relative to one another based at least in part on an association of each of the plurality of touch events with respective data interactions.

* * * * *